US 12,013,884 B2

United States Patent
Dana et al.

(10) Patent No.: US 12,013,884 B2
(45) Date of Patent: Jun. 18, 2024

(54) KNOWLEDGE GRAPH QUESTION ANSWERING WITH NEURAL MACHINE TRANSLATION

(71) Applicant: INTERNATIONAL BUSINESS MACHINES CORPORATION, Armonk, NY (US)

(72) Inventors: Saswati Dana, Bangalore (IN); Dinesh Garg, Beawar (IN); Dinesh Khandelwal, Indore (IN); G P Shrivatsa Bhargav, Bengaluru (IN); Sukannya Purkayastha, Dhubri (IN)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 17/810,013

(22) Filed: Jun. 30, 2022

(65) Prior Publication Data
US 2024/0004907 A1 Jan. 4, 2024

(51) Int. Cl.
*G06F 16/332* (2019.01)
*G06F 40/30* (2020.01)
*G06N 3/04* (2023.01)
*G06N 5/02* (2023.01)

(52) U.S. Cl.
CPC .......... *G06F 16/3329* (2019.01); *G06F 40/30* (2020.01); *G06N 3/04* (2013.01); *G06N 5/02* (2013.01)

(58) Field of Classification Search
CPC ....... G06F 16/3329; G06F 40/30; G06N 3/04; G06N 5/02
See application file for complete search history.

(56) References Cited

U.S. PATENT DOCUMENTS

| | | | |
|---|---|---|---|
| 10,606,846 B2* | 3/2020 | Li | G06N 7/01 704/200 |
| 2013/0262501 A1* | 10/2013 | Kuchmann-Beauger | G06F 16/24535 707/769 |
| 2018/0276525 A1* | 9/2018 | Jiang | G06N 3/084 704/200 |
| 2020/0089768 A1 | 3/2020 | Kim | |

(Continued)

FOREIGN PATENT DOCUMENTS

| CN | 113741886 A | * 12/2021 |
|---|---|---|
| CN | 114064931 A | 2/2022 |

(Continued)

OTHER PUBLICATIONS

Cai, et al., "An encoder-decoder framework translating natural language to database queries." Published Jun. 9, 2018 by ARXIV. 8 pages. https://arxiv.org/abs/1711.06061.

(Continued)

*Primary Examiner* — Yuk Ting Choi
(74) *Attorney, Agent, or Firm* — James L. Olsen

(57) ABSTRACT

A modular two-stage neural architecture is used in translating a natural language question into a logic form such as a SPARQL Protocol and RDF Query Language (SPARQL) query. In a first stage, a neural machine translation (NMT)-based sequence-to-sequence (Seq2Seq) model translates a question into a sketch of the desired SPARQL query called a SPARQL silhouette. In a second stage a neural graph search module predicts the correct relations in the underlying knowledge graph.

14 Claims, 4 Drawing Sheets

(56) References Cited

U.S. PATENT DOCUMENTS

2020/0334416 A1* 10/2020 Vianu ................ G06V 10/764
  704/200
2023/0162758 A1* 5/2023 Borgstrom ............. G10L 25/24
  704/200

FOREIGN PATENT DOCUMENTS

| CN | 115017299 A | * | 9/2022 | |
|---|---|---|---|---|
| WO | WO-2010137940 A1 | * | 12/2010 | ......... G06F 16/3329 |
| WO | WO-2016050066 A1 | * | 4/2016 | ........... G06F 16/243 |
| WO | WO-2017112813 A1 | * | 6/2017 | ....... G06F 16/90332 |

OTHER PUBLICATIONS

Diomedi, et al., "Question Answering over Knowledge Graphs with Neural Machine Translation and Entity Linking." Published Jul. 6, 2021 by ARXIV. 16 pages. https://arxiv.org/abs/2107.02865.

Purkayastha, et al., "A Deep Neural Approach to KGQA via SPARQL Silhouette Generation." Published Nov. 16, 2021. 8 pages. Evidence of Grace Period Use or Sale.

Srivastava, et al., "Complex Question Answering on knowledge graphs using machine translation and multi-task learning." Published Apr. 2021 by ACL Anthology. 12 pages. In Proceedings of the 16th Conference of the European Chapter of the Association for Computational Linguistics: Main Volume. pp. 3428-3439. DOI: 10.18653/v1/2021.eacl-main.300.

Yin, et al., "Neural machine translating from natural language to SPARQL." Published Apr. 2021 by Elsevier. 10 pages. In Future Generation Computer Systems, vol. 117, pp. 510-519. https://doi.org/10.1016/j.future.2020.12.013.

* cited by examiner

KNOWLEDGE GRAPH QUESTION ANSWERING WITH NEURAL MACHINE TRANSLATION

STATEMENT REGARDING PRIOR DISCLOSURES BY THE INVENTOR OR A JOINT INVENTOR

The following disclosure(s) are submitted under 35 U.S.C. 102(b)(1)(A): DISCLOSURES: "Knowledge Graph Question Answering via SPARQL Silhouette Generation," with authors and contributors of Sukannya Purkayastha, Saswati Dana, Dinesh Garg, Dinesh Khandelwal, G P Shrivatsa Bhargav, where this was made publicly available on Nov. 16, 2021, 13 pages long.

BACKGROUND

Question-answering (QA) is an increasingly utilized tactic in both natural language processing (NLP) and also artificial intelligence (AI) fields. For example, QA systems may be designed to receive a question in a natural language format, convert this natural language format into a format that can be queried, and then submit this query to a database, where one or all of these steps use various AI techniques to improve results. One popular example of this is knowledge graph QA (KGQA) systems, where the database is generated and/or stored as a knowledge graph (KG), which is a graph-based data model where concepts are stored as nodes or entities (and these entities may be connected by edges that represent relationships between these concepts). Once the KGQA system receives a question, it uses various NLP and/or AI techniques to convert that natural language question into a format that can be used to query the KG.

SUMMARY

Aspects of the present disclosure relate to a method, system, and computer program product relating to augmented query frameworks generated using neural machine translation (NMT) for knowledge graph question answer (KGQA) system datasets. For example, the method includes receiving an input question for a question-answering (QA) system. The method further includes translating the input question to a SPARQL Protocol and RDF Query Language (SPARQL) query using neural machine translation (NMT) and a neural graph search module. In this way, a modular two-stage neural architecture is used in translating a natural language question into a logic form such as a SPARQL Protocol and RDF Query Language (SPARQL) query, wherein in a first stage a NMT-based sequence-to-sequence (Seq2Seq) model translates a question into a sketch of the desired SPARQL query called a SPARQL silhouette, and in a second stage a neural graph search module predicts the correct relations in the underlying knowledge graph. A system and computer program configured to execute the method described above are also described herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
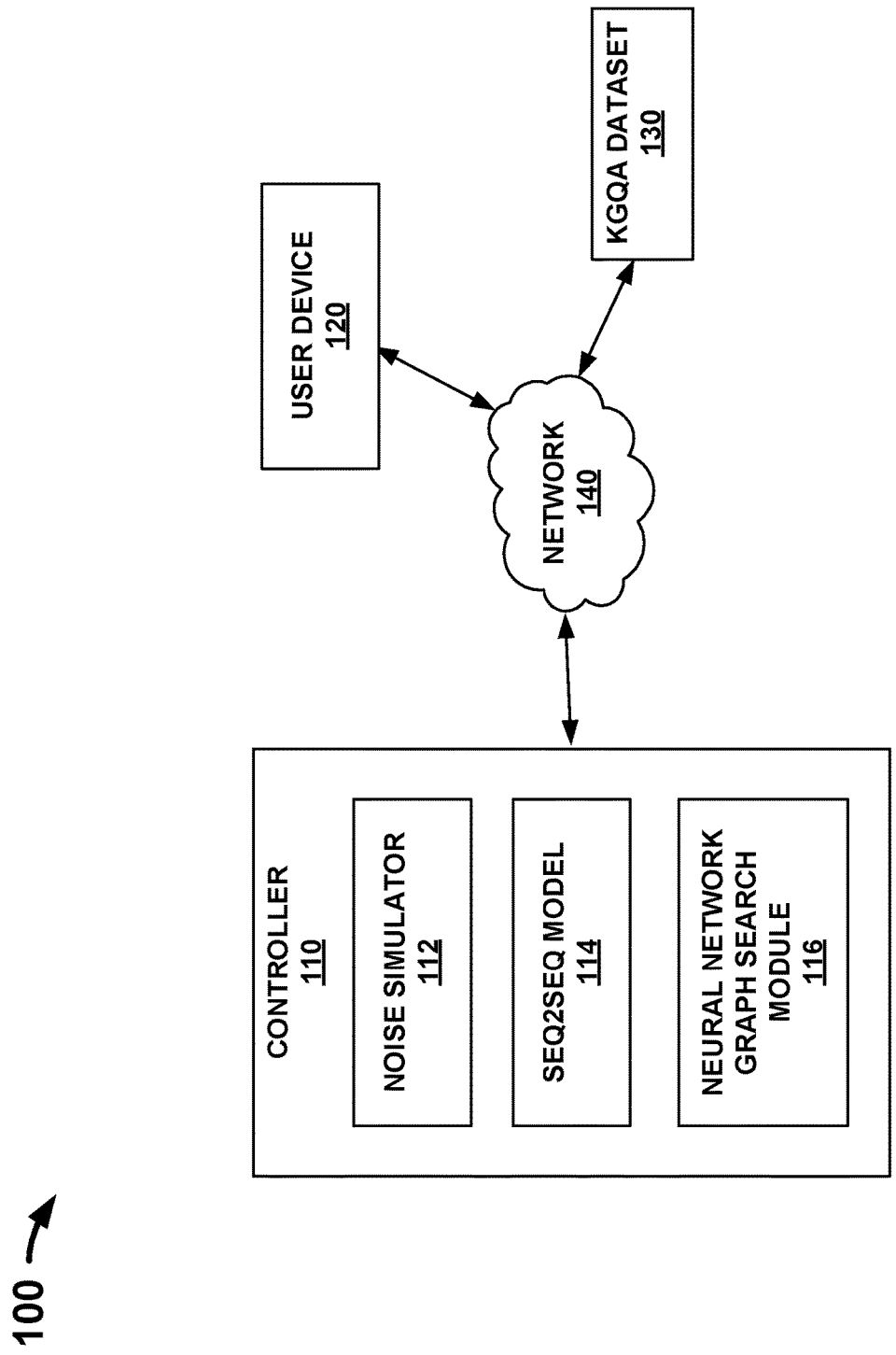
FIG. 1 depicts a conceptual diagram of an example system in which controller may augment SPARQL queries generated via neural machine translation for knowledge graph question-answer datasets.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to using a knowledge graph question answering (KGQA) system using neural machine translation (NMT), while more particular aspects of the present disclosure relate to modifying aspects of a query framework generated by NMT using a neural network, and/or modifying aspects of the query framework using a noise simulator. While the present disclosure is not necessarily limited to such applications, various aspects of the disclosure may be appreciated through a discussion of various examples using this context.

Question-answering (QA) is an increasingly utilized tactic in both natural language processing (NLP) and also artificial intelligence (AI) fields. For example, QA systems may be designed to receive a question in a natural language format, convert this natural language format into a format that can be queried, and then submit this query to a database, where one or all of these steps use various AI techniques to improve results. One popular example of this is knowledge graph QA (KGQA) systems, where the database is generated and/or stored as a knowledge graph (KG), which is a graph-based data model where concepts are stored as nodes or entities (and these entities may be connected by edges that represent relationships between these concepts). Once the KGQA system receives a question, it uses various NLP and/or AI techniques to convert that natural language question into a format that can be used to query the KG.

One approach in KGQA solutions may be generally defined as being based on semantic parsing. Semantic parsing based KGQA is accomplished by translating the natural language question into a logic form such as SPARQL Protocol and RDF (resource description framework) Query Language (SPARQL), sequel query language (SQL), combinatory categorial grammar (CCG), and the like. This query is then executed over the given KG to get the answer. This process of converting the natural language question into a logic form is known as semantic parsing.

More specifically, conventional techniques relating to KGQA may include a knowledge graph G comprising of an entity set E, a relation set R, and a set of knowledge facts F. In many conventional situations, these knowledge facts are expressed in the form of triples; $F=\{(e_s, r, e_o)\} \subseteq E \times R \times E$, where $e_s \in E$ is known as subject or head entity, $e_o \in E$ is known as object or tail entity, and r is a relation which connects these two entities. These entities (relations) form the nodes (edges) of the KG. The subsequent conventional task is to identify the subset of entities from E that constitute the answer of a given question Q in the natural language form. In the aforementioned semantic parsing task, the given question Q is first translated into a SPARQL which is then executed over the KG so as to get the answer set. When conventional solutions look to develop a system to convert a question into the corresponding SPARQL query, these conventional solutions typically use a set of training data $\{Qi, Si, Ai\}ni=1$, where Qi is a question (in natural language text), Si is the SPARQL query, and Ai is the answer set obtained by executing Si on G.

In semantic-parsing based approaches, one primary challenge in obtaining a sufficiently accurate form of logic (e.g., as captured via SPARQL or the like) is getting the right structure along with specific entities (e.g., nodes) and relations (e.g., edges) in the knowledge graph. The conventional entity-relation linking techniques tend to struggle at being robust enough for KGQA applications that require any noteworthy amount of accuracy, precision, and/or repeatability. Therefore, most conventional applications that utilize KGQA techniques require pipeline-based approaches, where these pipelines need to be both significantly robust yet also particularly delicately refined, for example they can be thusly refined with built in entity-relation linkers for the task(s) at hand. Creating such robust and precisely calibrated pipelines and entity-relation linkers is a time-intensive process that requires significant assistance from specialized data engineers. Accordingly, conventional techniques tend to be both error prone while also taking a significant amount of time and human expertise.

Conventional NMT-based approaches have been emerging as an alternative to semantic parsing, with an aim to alleviate the aforementioned shortcomings of pipelined-based approaches. Conventional NMT-based approaches tend to perform well at syntactic and semantic understandings of complex questions, in a way that pipeline-based approaches are not. However, conventional NMT-based approaches have a tendency to require large amounts of training data and also tend to perform poorly when they encounter unseen entities/relationships at test time (e.g., due to their fixed vocabulary).

Aspects of this disclosure improve or address technical shortcomings of conventional systems in making the usage of KGQA robust without accompanying over-engineering architecture. For example, aspects of this disclosure relate to a two stage neural approach for KGQA, where NMT is used to handle complex questions and masking techniques via a entity/relation linking module handles any previously unseen (e.g., unseen by NMT module) entities/relations.

For example, aspects of this disclosure relate to a neural network graph search module that includes a Bidirectional Encoder Representations from Transformers (BERT) based graph search module. By using a neural network graph search module, aspects of the disclosure may overcome weaknesses that would arise via failure of the entity/relation linker (e.g., from the NMT via a shortcoming of training of the NMT neural network). Further, aspects of this disclosure relate to masking mentions and entities/relations in the question text as well as within the SPARQL, in addition to simulating varying levels of noise in the entity/relation linking process. One or more computing devices that include one or more processing units executing instructions stored on one or more memories may provide the functionality that addresses these problems, where said computing device(s) are herein referred to as a controller. Specifically, aspects of this disclosure may utilize a sequence-to-sequence (Seq2Seq) model, where the input is sent to an entity and relation linker, and then following this linking it is sent to the Seq2Seq model, following which a SPARQL silhouette is generated, which is sent to the neural graph search module, after an improved version of the SPARQL query is provided.

Figure 3:
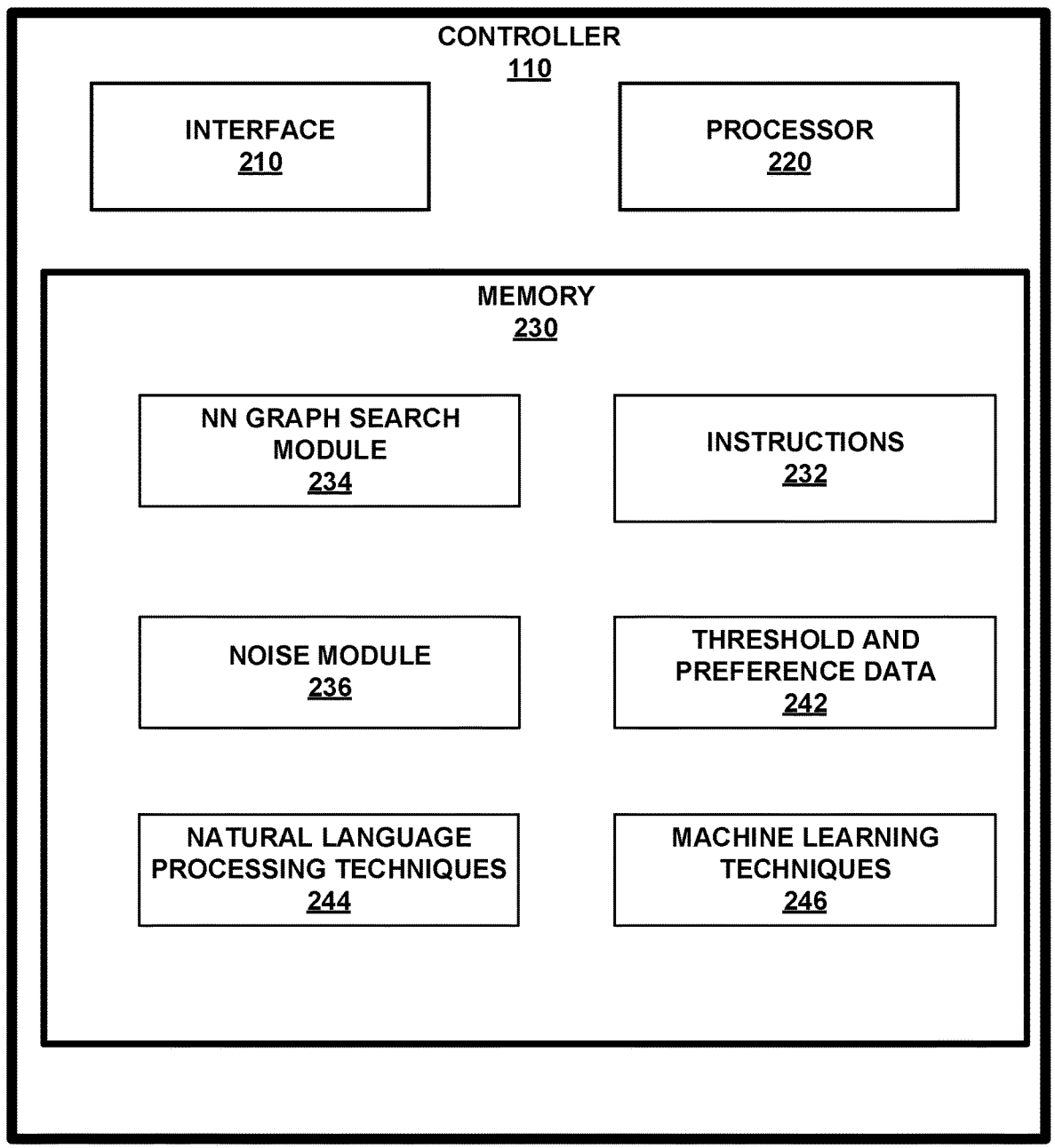
FIG. 3 depicts a conceptual box diagram of example components of the controller of FIG. 1.

For example, FIG. 1 depicts environment 100 in which controller 110 improves the usage of KGQA using NMT as discussed herein. Controller 110 may include a processor coupled to a memory (as depicted in FIG. 3) that stores instructions that cause controller 110 to execute the operations discussed herein. Controller 110 may detect an input question received from user device 120. Controller 110 may recognize this input question as being directed to a QA system, such as a QA system that utilizes KGQA dataset 130.

The input question is translated into a format suitable for KGQA dataset 130 via NMT-based Seq2seq model 114. For example, NMT based Seq2seq model 114 may translate the input question into a sketch of a desired resource description framework (RDF) such as SPARQL Protocol and RDF Query Language (SPARQL). This sketch may be referred to as a SPARQL silhouette. Though controller 110 is depicted as being structurally distinct from KGQA dataset 130 (and is not depicted as explicitly being incorporated into a discrete QA system), in some embodiments controller 110 may incorporate a QA system, such that KGQA dataset 130 is stored on controller 110, and/or an instance of controller 110 (and perhaps an instance of neutral network graph search module 116, noise simulator 112, and/or Seq2seq model 114) may be integrated into one or more external QA systems.

Once Seq2seq model 114 generates the query framework, controller 110 may cause noise simulator 112 to generate some noise within query framework, such as via masking specific mentions, entities, and/or relations of the input question. Noise simulator 112 may simulate various levels of noise in the entity/relation linking process. By masking specific mentions, entities, and relations in this way, controller 110 may enable QA system 110 to answer questions for entities and/or relationships that were not adequately covered during training (e.g., during training of the neural network that supports NMT module 134). Further, by masking specific mentions, entities, and relations, controller 110 may reduce a required vocabulary size of KGQA dataset 130. For example, in conventional solutions it may be required that the knowledge graph of KGQA dataset 130 includes a massive number of entities and relations, such that looking to generate query frameworks that perfectly satisfy all entities and/or relationships of KGQA dataset 130 may otherwise be impractical (or require the extremely robust set of pipelines as discussed earlier). As such, masking specific mentions, entities, and relations may functionally be a way to mimic the results of a larger vocabulary size (e.g., without having to put forth the time and resource to actually realize such a larger vocabulary size).

Controller 110 may cause noise simulator 112 to mask mentions and entities/relations in numerous different ways. For example, in a first situation controller 110 may cause noise simulator 112 to simulate an entity/relation linker that has 100% F1 (e.g., ideal noise as described herein), such that all entities and relations are extracted from the gold SPARQL using their given prefixes (e.g., dbr for entities and dbp or dbo for relations using standard SPARQL terminology). At this point, controller 110 aligns these entities/relations with surface-form mention text in the given question, upon which controller 110 has noise simulator mask surface form entities/relations in question text and entities/relations in the generated SPARQL framework.

In this way, aspects of this disclosure relate to using external entity/relation linkers to map surface form mentions and linking. For example, based on the suggestion of these external linkers, noise simulator 112 masks mentions and entities/relations in the input question text and corresponding gold SPARQL for the training data. Noise simulator 112 employs different masking schemes depending on the desired level of noise. The masked question is used as an input to the CNN-based seq2seq model 114 which converts it into the SPARQL silhouette. Though seq2seq model 114 may be based on a recurrent neural network, a convolutional neural network, or a transformer architecture, in some examples a CNN based seq2seq model 114 model may perform better.

The purpose of designing noise simulator module as discussed herein both (i) masks mentions and entities/relations in the question text as well as SPARQL, on top of (ii) simulating varying levels of noise in the entity/relation linking process. Masking improves results in two ways: (i) handling test entities/relations that are unseen during training, and (ii) reducing vocabulary size as KGs contain a large number of entities and relations.

For example, though a simple neural seq2seq model which translates natural language question into a SPARQL query may struggle to output some of the entities/relations during test time that are unseen during training time and hence may not be available in the output vocabulary. As detailed below, in a first "noise-free linking" scenario, controller 110 simulates an entity/relation linker that has 100% F1. Controller 110 extracts all the entities/relations from the gold SPARQL and assume these as output of the linker.

Next controller 110 aligns these entities (dbr) and relations (dbp and dbo) with the surface form in the given question. Controller 110 observes that entities match exactly with substrings in the questions most of the time (e.g., Austin College as below). For relations, other than substring match, controller 110 considers semantic similarity; e.g., a given relation dbo:film may be semantically best aligned to word movies in the question. Controller 110 uses pre-trained fastext embeddings to represent words and relations and compute cosine similarity between each word in the question and the given relation. Controller 110 considered the highest-scoring word the aligned word.

In a "partly noisy linking" scenario, controller 110 allows partial noise in the entity/relation linking process. For this, controller 110 first feeds the natural language question into an external entity/relation linker. The linker may return two objects: (i) a set of surface form mentions for entities/relations in the question text, and (ii) Linked entities/relations for these mentions. Controller 110 takes the output from this external linker and finds intersections of these entities/relations with the entities/relations present in the gold SPARQL, where these common entities/relations are masked in the SPARQL. Also, their corresponding surface forms are masked in the question text. In order to mask the surface form in the question, controller 110 uses exact match and string overlap based Jaccard similarity.

In a "fully noisy linking" scenario, controller 110 simulates a completely realistic scenario where controller 110 relies entirely on an external entity/relation linker. For this, controller 110 feeds input question to the entity/relation linker and gets the suggested surface form mentions and linked entities/relations. Controller 110 masks these suggested mentions using exact match and partial match. Corresponding SPARQL query's entities/relations are also masked based on the suggestions.

Specifically, to detail these three noise scenarios, an example of this first scenario includes a situation where a question of:

---

Name the mascot of Austin College?
is provided with a gold SPARQL query of:
    SELECT ?uri WHERE {dbr:Austin_College dbp:mascot ?uri }
Following this, controller 110 executes embedding based surface alignment to turn the question into:
    Name the <r0> of <e0>
with a resulting query of:
    SELECT ?uri WHERE { <e0> <r0> ?uri}
Such that the final masked input that is actually utilized includes a question and query, respectfully, of:
    name the <r0> of <e0> ?
  SELECT var_uri WHERE brack_open <e0> <r0> var_uri brack_close

---

In another example, controller 110 may cause noise simulator 112 to generate noise in a different way to allow partial/realistic noise in the entity/relation linking process. For example, controller 110 may feed the natural language input question into an entity/relation linker (e.g., one of QA system 130, and/or another external linker). Controller 110 may receive two objects from this external linker. For example, controller 110 may receive a set of surface form mentions for the entities and relations that are in the question text. Further, controller 110 may receive the linked entities and relations for each of these mentions. Controller 110 then identifies intersections between the output from the linker and the entities/relations present in the gold SPARQL, where some entities and/or relations are identified as common (e.g., shared) between the two. At this point, controller 110 causes noise simulator 112 to mask the common entities and relations in the SPARQL query. In some examples, the corresponding surface forms are masked in the natural language question text.

For example, to use the question regarding the Austin College as used above, an example of this second scenario includes the question being sent to the entity and relation linker, where the query is sent to an entity and relation extraction. From here, the entity and relation linker may return results of dbr: Austin_College
dbp: name

```
        dbo: mascot
while the entity and relation extraction from the gold SPARQL query returns results of:
        dbr: Austin_College
        dbp: mascot
Following this, controller 110 may analyze for an intersection between these results from the
entity and relation linker and the entity and relation extraction to identify an intersection of:
        dbr: Austin_College
Following this, controller 110 may mask entities and relations, such that the result masked
question and query, respectively, is:
        name the mascot of <e0>
    SELECT var_uri WHERE brack_open <e0> <dbp_mascot> var_uri brack_close
```

In yet another example, controller 110 may cause noise simulator 112 to generate noise in a different way such that there is "fully" noisy linking, with the goal being to simulate a significantly noisy scenario. For example, controller 110 relies on an external entity/relation linker (e.g., external to controller 110, and/or external from both controller 110 and QA system 130). Controller 110 would feed the input question to this external entity/relation linker and get the suggested surface form mentions and linked entities/relations. Upon received the output from this external linker, controller 110 causes noise simulator to mask each of these suggested mentions using exact match and partial match.

For example, to again use the Austin College example to demonstrate, an example of this fully realistic noisy scenario includes the question being sent to the entity and relation linker, where the query is sent to an entity and relation extraction. From here, the entity and relation linker may return results of

```
        dbr: Austin_College
            dbp: name
            dbo: mascot
while the entity and relation extraction from gold SPARQL query returns results of:
        dbr: Austin_College
            dbp: mascot
Following this, controller 110 utilizes (e.g., defaulting to relying entirely on) an external
entity/relation linker and mask entities and relations such that the resultant masked question and
query, respectively, is:
        <r0> the <r1> of <e0> ?
    SELECT var_uri WHERE brack_open <e0> <dbp_mascot> var_uri brack_close
```

Controller 110 modify queries for KGQA dataset 132 using neural network graph search module 116 and noise simulator over network 140. Network 140 may include a computing network over which computing messages may be sent and/or received. For example, network 140 may include the Internet, a local area network (LAN), a wide area network (WAN), a wireless network such as a wireless LAN (WLAN), or the like. Network 190 may comprise copper transmission cables, optical transmission fibers, wireless transmission, routers, firewalls, switches, gateway computers and/or edge servers. A network adapter card or network interface in each computing/processing device (e.g., user device 120, and computing devices that host/include QA system 130 and/or controller 110) may receive messages and/or instructions from and/or through network 140 and forward the messages and/or instructions for storage or execution or the like to a respective memory or processor of the respective computing/processing device. Though network 140 is depicted as a single entity in FIG. 1 for purposes of illustration, in other examples network 140 may include a plurality of private and/or public networks.

In this way, pairs of masked question and SPARQL query obtained from noise simulator 112 is fed to a Convolutional Neural Network (CNN) based seq2seq model 114. Seq2seq model 114 reads the entire masked question and then predicts the corresponding masked SPARQL query token-by-token in a left-to-right manner. This seq2seq model 114 consists of an input embedding layer. Both encoder and decoder consist of an embedding layer that maps each input token to a point-wise summation of its word embedding and positional embedding. In some examples, the embedding of each word is initialized randomly. In order to capture the sense of order, seq2seq model 114 is provisioned with the positional embedding. Seq2seq model 114 further includes convolution+pooling Layers. The token embeddings obtained from the previous layer are fed to the multiple convolution and pooling layers. Each convolution layer consists of a 1-dimensional convolution followed by Gated Linear Units (GLU). Residual connections may be added from input to the output of each convolution layer. Seq2seq model 114 further includes multi-step attention. Each decoder layer comprises a convolution layer followed by a multi-step attention layer. This multi-step attention is used to find the attention scores from a particular decoder state to the source tokens. Attention between decoder state di (after $i_{th}$ layer) of the last token in generated sequence so far and state $z_j$ of the $j_{th}$ source element (after last encoder layer) is computed as:

$$a_j^i = \exp(d_i \cdot z_j)/\Sigma_{t=1}^m \exp(d_i \cdot z_t)$$

where, m is the number of source elements. The context vector, $c_i$, is now computed as:

$$c_i = [\Sigma_{j=1}^m a_j^i (z_j + e_j)] + d_i$$

where, $e_j$ is the input embedding for the source element j.

Finally, seq2seq model 114 further includes an output layer, in which output at a particular time step is calculated over all the Z possible tokens, $$P(z_{t+1}|z_1, \ldots, z_t, X) = \text{softmax}(Wd_L + b)$$

where each of $$P(z_{t+1}|\cdot) \in \mathbb{R}^Z, W, b$$

are trainable parameters, $d_L$ is the decoder state of last target element at the last layer L, and X is the input sequence.

Seq2seq model 114 further includes training loss, where seq2seq model 114 is trained using label smoothed cross-entropy loss given by following expression (for single training $$L(\theta) = -(1/N) \cdot \Sigma_{n=1}^{N} \Sigma_{z=1}^{Z} q(\mathcal{Y}_n = z | \mathcal{Y}_{n-1}) \cdot \log P_\theta(\mathcal{Y}_n = z | \mathcal{Y}_{n-1}) \text{example})$$

where, N is the number of words in output sequence and $y_n$ is the first n tokens of output sequence. $P\theta(y_n=z|y_n-1)$ is model's probability to output token z given yn−1 sequence generated so far. The quantity $q(y_n=z|y_n-1)$ is equal to γ if $f(y_n)=z$ and $(1-\gamma)/(Z-1)$ o/w, where γ∈[0, 1], γ>1/Z.

Controller 110 may then cause neural network graph search (NGS) module 116 to take a SPARQL silhouette as input and produce an improved version of SPARQL by replacing incorrect relations. In some examples, NGSmodule 116 is a BERT-based module. NGSmodule 116 may be configured to consider each triple (es, r, eo) in the SPARQL silhouette in which at least one of the entities is an existential variable unless the silhouette is with rdf:type relation (e.g., which is handled separately).

NGSmodule 116 prepares input in the following format: [CLS] Q [SEP] [SUB (or OBJ)] [SEP] es (or eo). Here, Q is the token sequence of input question text and [SUB (or OBJ)] is a special token depending on whether the grounded entity is in subject (or object) position (refer to FIG. 2). NGSmodule 116 passes grounded entity (es or eo) as the last element of this input. As would be understood by one of ordinary skill in the art, [CLS] and [SEP] are special tokens from BERT vocabulary.

Following this, the above input sequence of tokens into the BERT layer of NGSmodule 116. The output from the [CLS] token, hCLS is passed through a linear layer followed by a softmax layer. This softmax layer induces a probability score pr for each relation r ∈R in the given KG. While training, controller 110 uses the following loss function (given for single example): $\ell = (1-\alpha)^*(\ell c) + (\alpha)^*(\ell gs)$. Here, $\ell c$ denotes standard cross entropy loss between predicted probabilities {pr}r∈R and the gold relation. The graph search loss term $\ell$ gs forces the predicted probabilities to be low for all those relations which are invalid relations (in the given KG) for corresponding input entity es (or eo) in the input position (subject or object). $\ell$ gs is the Binary Cross-Entropy for logits followed by a sigmoid layer. For this, controller 110 assumes a uniform probability distribution over all such valid relations and compute its cross entropy loss with {pr}r∈R. α is a hyperparameter.

During inference, at softmax layer, controller 110 restricts the outputs only to those relations r∈R which are valid relations for the input entity as being subject or object. For example, if input grounded entity is es then controller 110 restricts prediction to only those relations r for which ⟨ es, r, ?x⟩ is a valid triple for some grounding of ?x. In DBpedia same relation can exist in the form of 'dbo' and 'dbp' for a specific entity. In such cases, controller 110 picks the 'dbo' version as these are curated and mapped to the DBpedia ontology. Prediction is made based out of 61623 relations available in DBpedia.

From here, controller 110 has a separate version of NGS module 112 if the relation r in a given triple is rdf:type. Note that in DBpedia, a triple containing rdf:type relation looks like this ⟨ ?x, rdf:type, CLASS⟩ where, ?x is a variable and CLASS is the DBpedia ontology class of the entity ?x. For such triples, input to the respective NGSmodule 116 is [CLS] Q. Controller 110 is configured to predict the corresponding ontology class, CLASS. DBpedia ontology contains 761 classes and hence, in this model, prediction is one of these 761 classes. NGSmodule 116 is trained with standard cross-entropy loss. An example of the rdf:type classification would be to predict dbo:Country for the question 'Name the country with currency as Aureus?'.

Figure 2:
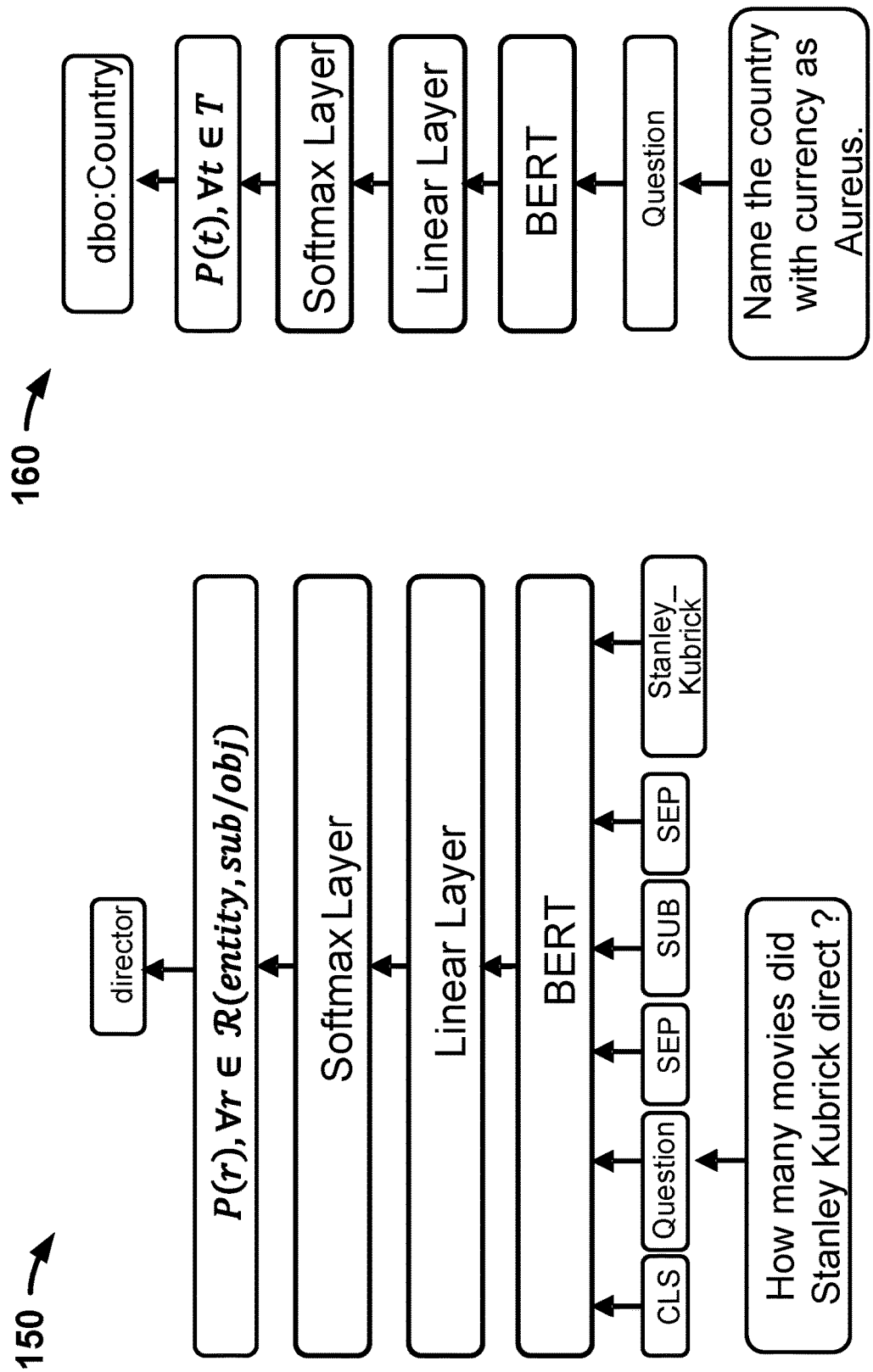
FIG. 2 depicts a conceptualization of the design principles with which the controller of FIG. 1 augments query frameworks.

FIG. 2 depicts design principles of aspects of the present disclosure. Specifically, FIG. 2 depicts an example flow 150 by which a relation classifier as described herein predicts the relation for a given entity. For example, as depicted, the relation classifier may receive a question of "How many movies did Stanley Kubrick direct," where other conventional approaches might have difficulty fully identifying the relation of this question (e.g., otherwise finding the number of movies that Stanley Kubrick produced, or acted in, or identifying television shows that he was associated with, or the like). As depicted, the flow 150 moves from question, to the BERT, to the linear layer, to the softmax layer, and then finally uses the formula:

$$P(r), \forall r \in \mathcal{R}(\text{entity,sub/obj})$$

to identify at the proper relation of "director."

Similarly, FIG. 2 depicts flow 160 by which an ontology type classifier may predict an appropriate rdf:type ontology class herein. Specifically, for a question "Name the country with currency as Aureus," flow 160 moves from the question, to the BERT, to the linear layer, to the softmax layer, and then uses formula:

$$P(t), \forall t \in T$$

to arrive at the proper class of dbo:Country.

As described above, controller 110 may include or be part of a computing device that includes a processor configured to execute instructions stored on a memory to execute the techniques described herein. For example, FIG. 3 is a conceptual box diagram of such computing system 200 of controller 110. While controller 110 is depicted as a single entity (e.g., within a single housing) for the purposes of illustration, in other examples, controller 110 may include two or more discrete physical systems (e.g., within two or more discrete housings). Controller 110 may include interface 210, processor 220, and memory 230. Controller 110 may include any number or amount of interface(s) 210, processor(s) 220, and/or memory(s) 230.

Controller 110 may include components that enable controller 110 to communicate with (e.g., send data to and receive and utilize data transmitted by) devices that are external to controller 110. For example, controller 110 may include interface 210 that is configured to enable controller 110 and components within controller 110 (e.g., such as processor 220) to communicate with entities external to controller 110. Specifically, interface 210 may be configured to enable components of controller 110 to communicate with user device 120, QA system 130, or the like. Interface 210 may include one or more network interface cards, such as Ethernet cards and/or any other types of interface devices that can send and receive information. Any suitable number of interfaces may be used to perform the described functions according to particular needs.

As discussed herein, controller 110 may be configured to augment query frameworks for KGQA systems translated via NMT. Controller 110 may utilize processor 220 to augment query framework in this way. Processor 220 may include, for example, microprocessors, digital signal processors (DSPs), application specific integrated circuits (ASICs), field-programmable gate arrays (FPGAs), and/or equivalent discrete or integrated logic circuits. Two or more of processor 220 may be configured to work together to augment query frameworks via a noise simulator and/or a neural network graph search module as described herein accordingly.

Processor 220 may augment query frameworks according to instructions 232 stored on memory 230 of controller 110. Memory 230 may include a computer-readable storage medium or computer-readable storage device. In some examples, memory 230 may include one or more of a short-term memory or a long-term memory. Memory 230 may include, for example, random access memories (RAM), dynamic random-access memories (DRAM), static random-access memories (SRAM), magnetic hard discs, optical discs, floppy discs, flash memories, forms of electrically programmable memories (EPROM), electrically erasable and programmable memories (EEPROM), or the like. In some examples, processor 220 may augment query frameworks as described herein according to instructions 232 of one or more applications (e.g., software applications) stored in memory 230 of controller 110.

In addition to instructions 232, in some examples gathered or predetermined data or techniques or the like as used by processor 220 to augment query frameworks for KGQA systems as described herein may be stored within memory 230. For example, memory 230 may include information described above that is gathered from environment 100. Specifically, as depicted in FIG. 3, memory 230 may include neural network graph search module 234 and/or noise simulator 236. Neural network graph search module 234 may include data or techniques from neural network graph search module 116, while noise simulator may include data and/or techniques from noise simulator 112.

Further, memory 230 may include threshold and preference data 242. Threshold and preference data 242 may include thresholds that define a manner in which controller 110 is to generate noise for query framework via noise module 236, and/or modify aspects of the query framework via neural network graph search module 234. For example, threshold and preference data 242 may include thresholds at which controller 110 is to cause noise module 236 to generate noise, cause neural network graph search module to modify aspects of the query framework, or the like.

Memory 230 may further include natural language processing (NLP) techniques 244. NLP techniques 244 can include, but are not limited to, semantic similarity, syntactic analysis, and ontological matching. For example, in some embodiments where computer system 200 include NMT module 134, processor 220 may be configured to analyze natural language data of input question or the like as gathered from user device 120 of network 140 to determine semantic features (e.g., word meanings, repeated words, keywords, etc.) and/or syntactic features (e.g., word structure, location of semantic features in the input question, etc.) of this natural language data. Ontological matching could be used to map semantic and/or syntactic features to a particular concept. The concept can then be used to translate this input question into a query framework with which KGQA dataset 132 can be mined as described herein.

Memory 230 may further include machine learning techniques 246 that controller 110 may use to improve a process of augmenting query frameworks as described herein over time. Machine learning techniques 246 can comprise algorithms or models that are generated by performing supervised, unsupervised, or semi-supervised training on a dataset, and subsequently applying the generated algorithm or model to manage query framework augmentation. Using these machine learning techniques 246, controller 110 may improve an ability of determining how and when to augment query frameworks so that an eventual accuracy and reliability of QA system 130 is increased. For example, controller 110 may track a performance of how QA system answers questions from user devices 120, may identify how this correlates with certain types of modifications generated via neural network graph search module 116 and/or various types of noise as generated by noise simulator 112, and use this tracking to reinforce those augmentations that improve performance (and de-emphasizes any augmentations that decrease performance), becoming better at this over time as more and more data is gathered and analyzed.

Machine learning techniques 246 can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques. Specifically, machine learning techniques 246 can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning algorithms.

Figure 4:
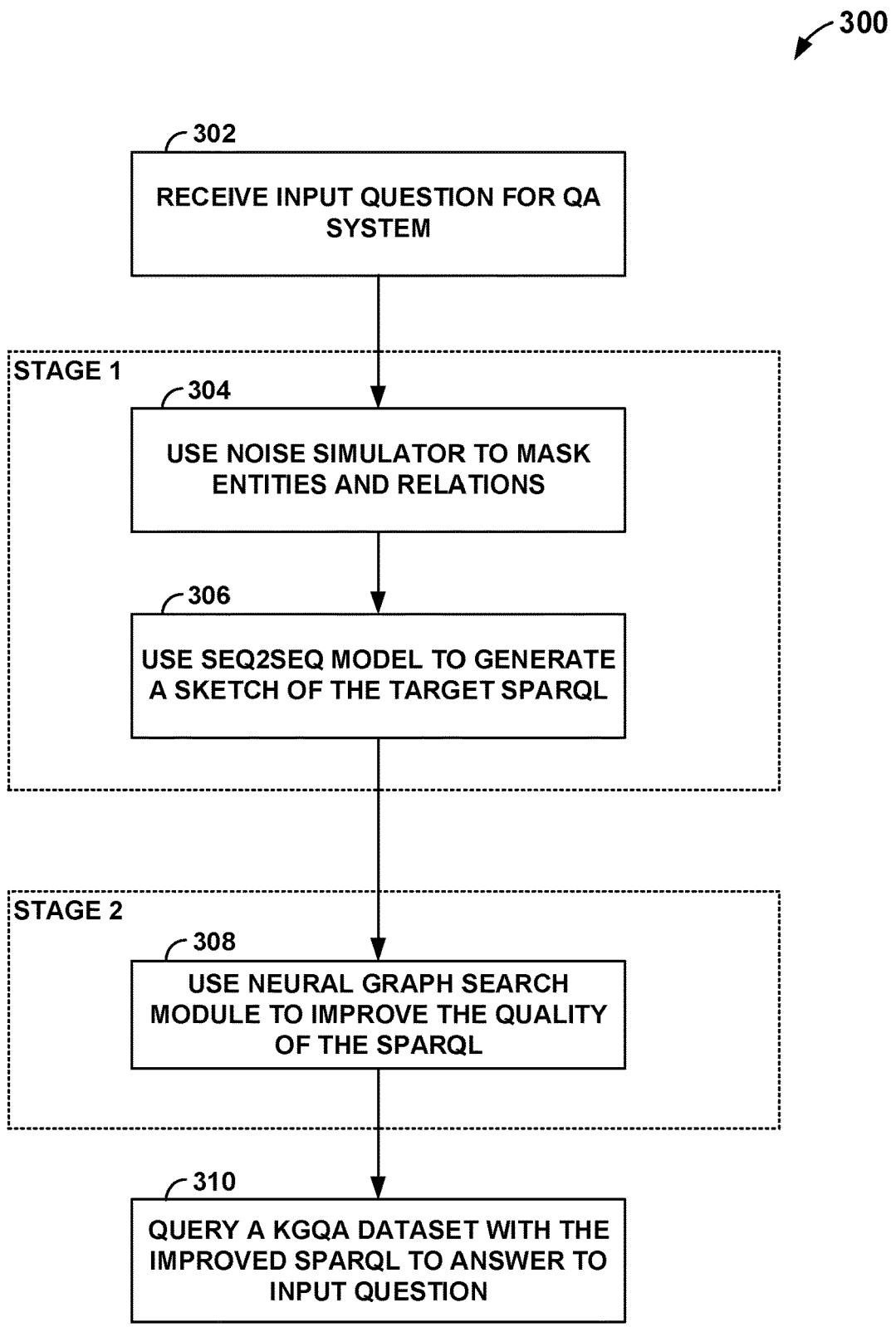
FIG. 4 depicts an example flowchart by which the controller of FIG. 1 may augment SPARQL queries.

Using these components, controller 110 may augment query frameworks as discussed herein. For example, controller 110 may augment query frameworks according to flowchart 300 depicted in FIG. 4. Flowchart 300 of FIG. 4 is discussed with relation to FIG. 1 for purposes of illustration, though it is to be understood that other environments with other components may be used to execute flowchart 300 of FIG. 4 in other examples. Further, in some examples controller 110 may execute a different method than flowchart 300 of FIG. 4, or controller 110 may execute a similar method with more or less steps in a different order, or the like.

Controller 110 receives an input question for a QA system (302). Controller 110 may receive this input question as sent from user device 120. For example, a user may have generated a natural language question on user device 120 on an online software-as-a-service (SaaS) instance of a QA system.

In stage 1, controller 110 may use a number of masking schemes and models to mask the entities and relations present in the input question to overcome shortcomings of NMT. Specifically, controller 110 sends this input question to noise simulator 112 to mask entities and relations (304) of the input question as discussed herein. From here what is created by noise simulator 112 is sent to seq2seq model 114 to generate a sketch of the target SPARQL for this natural language input question (306). As discussed herein, this sketch may be referred to as a SPARQL silhouette. In some examples, controller 110 may execute the entity/relation linking separately via an off-the-shelf entity/relation linker.

From here, controller 110 may enter stage 2, where controller 110 causes neural network graph search module 116, which receives the SPARQL silhouette as an input and improves the quality of the SPARQL (308). Obviously, once the SPARQL query is in a finished format, controller 110 may use this improved SPARQL query to answer the input question. Specifically, controller 110 may answer the input question by querying KGQA dataset 130 with the finalized SPARQL query (310).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-situation data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
receiving an input question for a question-answering (QA) system;
masking, by a noise simulator, entities and relations of the input question to generate a masked input question;
translating the masked input question to a SPARQL Protocol and RDF Query Language (SPARQL) query silhouette using neural machine translation (NMT);
generating, by a neural network graph search module using the SPARQL query silhouette, a finalized SPARQL query, wherein the neural network graph search module is a Bidirectional Encoder Representations from Transformers (BERT) based graph search module; and
querying, using the finalized SPARQL query, the QA system to obtain an answer to the received input question.

2. The computer-implemented method of claim 1, wherein the noise simulator is configured to simulate a realistic amount of noise by employing a corresponding masking strategy for entities and relations.

3. The computer-implemented method of claim 1, wherein the noise simulator is configured to simulate an idealistic amount of noise by employing a corresponding masking strategy for entities and relations.

4. The computer-implemented method of claim 1, wherein the noise simulator is configured to simulate a significant amount of noise by employing a corresponding masking strategy for entities and relations.

5. The computer-implemented method of claim 1, wherein the NMT is a sequence-to-sequence (Seq2Seq) model used to translate the masked input question to the SPARQL query silhouette.

6. A system comprising:
a processor; and
a memory in communication with the processor, the memory containing instructions that, when executed by the processor, cause the processor to:
receive an input question for a question-answering (QA) system;
mask, by a noise simulator, entities and relations of the input question to generate a masked input question;
translate the masked input question to a SPARQL Protocol and RDF Query Language (SPARQL) query silhouette using neural machine translation (NMT);
generate, by a neural network graph search module using the SPARQL query silhouette, a finalized SPARQL query, wherein the neural network graph search module is a Bidirectional Encoder Representations from Transformers (BERT) based graph search module; and
query, using the finalized SPARQL query, the QA system to obtain an answer to the received input question.

7. The system of claim 6, wherein the noise simulator is configured to simulate a realistic amount of noise by employing a corresponding masking strategy for entities and relations.

8. The system of claim 6, wherein the noise simulator is configured to simulate an idealistic amount of noise by employing a corresponding masking strategy for entities and relations.

9. The system of claim 6, wherein the noise simulator is configured to simulate a significant amount of noise by employing a corresponding masking strategy for entities and relations.

10. The system of claim 6, wherein the NMT is a sequence-to-sequence (Seq2Seq) model used to translate the masked input question to the SPARQL query silhouette.

11. A computer program product, the computer program product comprising a computer readable storage medium having program instructions embodied therewith, the program instructions executable by a computer to cause the computer to:
receive an input question for a question-answering (QA) system;
mask, by a noise simulator, entities and relations of the input question to generate a masked input question;
translate the masked input question to a SPARQL Protocol and RDF Query Language (SPARQL) query silhouette using neural machine translation (NMT);
generate, by a neural network graph search module using the SPARQL query silhouette, a finalized SPARQL query, wherein the neural network graph search module is a Bidirectional Encoder Representations from Transformers (BERT) based graph search module; and
query, using the finalized SPARQL query, the QA system to obtain an answer to the received input question.

12. The computer program product of claim 11, wherein the noise simulator is configured to simulate an idealistic amount of noise by employing a corresponding masking strategy for entities and relations.

13. The computer program product of claim 11, wherein the noise simulator is configured to simulate a realistic amount of noise by employing a corresponding masking strategy for entities and relations.

14. The computer program product of claim 11, wherein the noise simulator is configured to simulate a significant amount of noise by employing a corresponding masking strategy for entities and relations.

\* \* \* \* \*